United States Patent Office 2,774,712
Patented Dec. 18, 1956

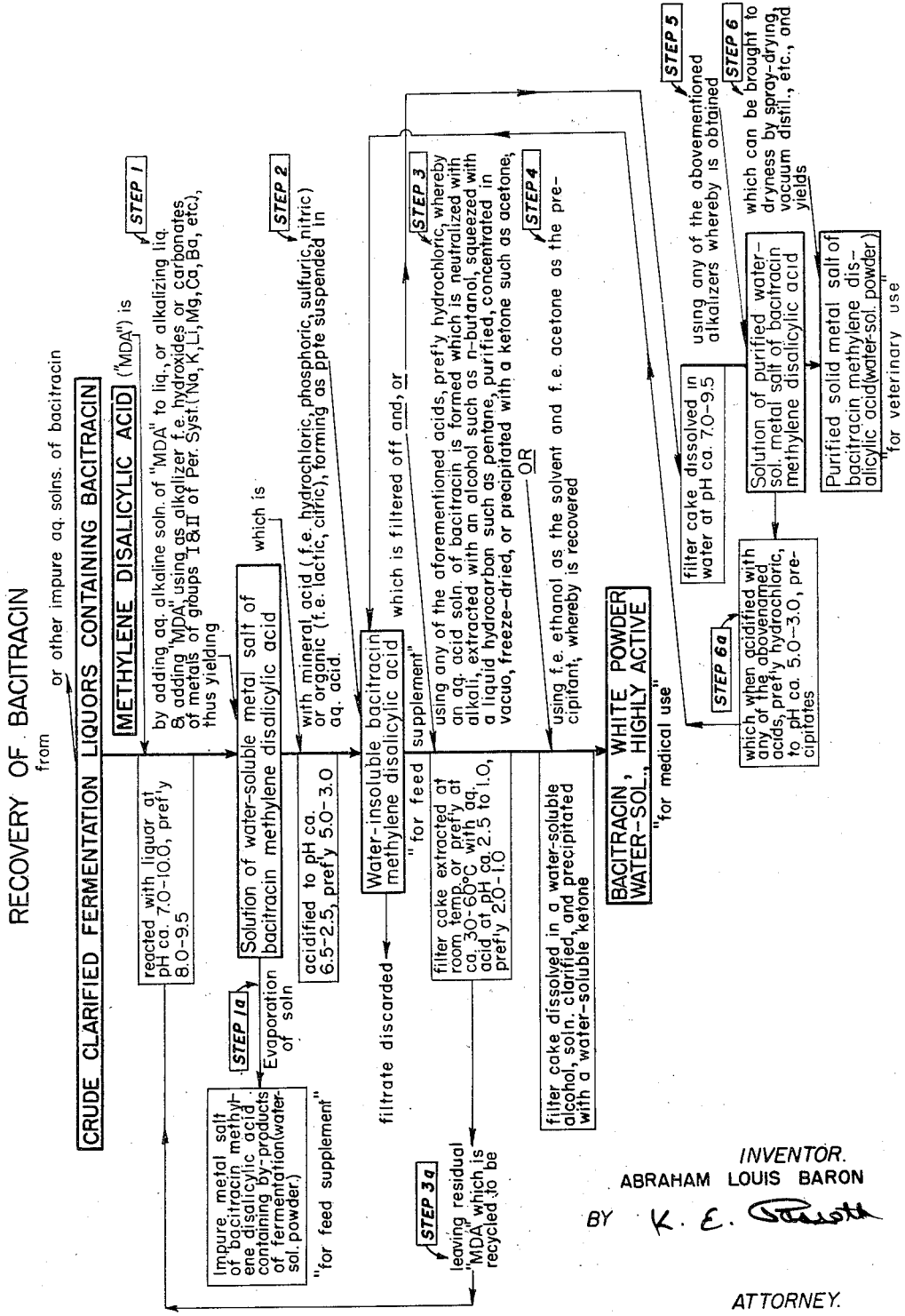
Dec. 18, 1956 — A. L. BARON — 2,774,712
BACITRACIN COMPOUND AND RECOVERY OF BACITRACIN
Filed Nov. 14, 1955
INVENTOR.
ABRAHAM LOUIS BARON
BY K. E. [signature]
ATTORNEY.

2,774,712

BACITRACIN COMPOUND AND RECOVERY OF BACITRACIN

Abraham Louis Baron, Bloomfield, N. J., assignor to S. B. Penick & Company, New York, N. Y.

Application November 14, 1955, Serial No. 546,330

13 Claims. (Cl. 167—65)

My invention relates to processes for the recovery of bacitracin from crude fermentation liquors containing it. More particularly, my invention is concerned with (a) an improvement in such processes which includes forming in the clarified crude fermentation liquors a water-soluble metal salt of bacitracin-methylene disalicylic acid; precipitating from the liquors containing said salt the compound bacitracin-methylene disalicylic acid which is useful per se, insoluble in water but can readily be converted into said water-soluble metal salt; and liberating free bacitracin from said bacitracin-methylene disalicylic acid; and, (b) with the said water-soluble salts so obtained which can readily be isolated from their solutions and are also useful per se.

A crude bacitracin-containing fermentation liquor may be produced, for example, by the method described by Anker et al. in the Journal of Bacteriology, 55:249–255, 1948, which uses as the organism a gram-positive, spore-forming aerobic rod belonging to the *Bacillus lichenformis* group. This crude liquor is filtered and a clarified crude liquor suitable for treatment according to my process illustrated in the attached flow sheet is thus obtained.

My invention includes the step of mixing methylene disalicylic acid with a clarified crude fermentation liquor containing bacitracin under alkaline conditions, thereby forming a water-soluble metal salt of bacitracin-methylene disalicylic acid which can be recovered as by evaporation of water. Further, such aqueous solution of such metal salt can be treated to split the metal ion from the salt and leave free bacitracin-methylene disalicylic acid which is water-insoluble. The bacitracin-methylene disalicylic acid can be treated to yield free bacitracin which can be readily recovered in pure form. The methylene disalicylic acid split from the bacitracin can be recycled in the process. The said water-soluble and water-insoluble bacitracin-containing compounds are usable as ingredients of feed supplements for animals, as veterinary therapeutic agents and as a source from which substantially pure bacitracin can readily be isolated in high yields based on the bacitracin content of the starting crude liquors.

In conducting the processes of my invention as set forth above and illustrated in the flow sheet it is to be understood, with reference to Step 1 of the processes, that the methylene disalicylic acid can be added to the crude clarified fermentation liquor as an aqueous alkaline solution of the acid, or it can be dissolved therein after the pH of the liquor has been adjusted to the alkaline side; I prefer the former method. The acid can be added to the liquor in an amount at least equal to the weight of bacitracin present in the liquor, but it is preferably added in an amount above about two times by weight of acid to bacitracin. More acid may be used but no economic advantage accrues therefrom. The lower limit of alkalinity to form the water-soluble metal salt is about pH 7.0, while above about pH 10.0 deactivation of the bacitracin occurs. I prefer to adjust the pH to between about 8.0 to 9.5. The alkalinity adjusting agents, hereinafter referred to as the alkali-metal bases, which can be used in practicing the present invention are such reagents as the hydroxides and carbonates of sodium, potassium, lithium, magnesium, calcium, barium, and the like. In Step 1a, the reaction mixture can be concentrated or brought to dryness by evaporation of the water present through spray-drying, evaporating in vacuo, and other similar procedures. The product thus obtained is an impure water-soluble metal salt, f. e. the sodium salt, of bacitracin methylene disalicylic acid which contains some by-products carried over from the fermentation liquor; it is a powder which can be used as an ingredient in feed supplements for animals.

In Step 2 the recovery of the water-insoluble bacitracin-methylene disalicylic acid can be accomplished by acidifying the aqueous solution of the water-soluble metal salt described in Step 1 above, with a mineral acid such as hydrochloric, phosphoric, sulfuric, nitric and the like, or with an organic acid such as lactic or citric, to a pH between about 6.5 to 2.5, preferably between about 5.0 to 3.0. Above about pH 6.0 solubilization occurs and below about 2.0 free bacitracin is liberated. Upon acidification of the solution, a precipitate is formed in suspension which is filtered off. The filter cake contains the water-insoluble bacitracin methylene disalicylic acid; the filtrate is discarded.

In Step 3 the water-insoluble bacitracin-methylene disalicylic acid of Step 2 is extracted in suspension with aqueous acid at a pH of between about 2.5 to 1.0, preferably between about 2.0 to 1.0, whereby bacitracin is liberated in aqueous acid solution and a residue primarily consisting of recovered methylene disalicylic acid remains. Any of the mineral or organic acids employed in the precipitation Step 2 can be used in the extraction but I prefer to apply hydrochloric acid. The extracted suspension is filtered and the filtrate reserved for recovery of pure bacitracin, as further described below. The filter cake, consisting primarily of methylene disalicylic acid, can be recycled to the crude fermentation liquor as in Step 3a, thus reducing the overall requirement for methylene disalicylic acid and providing a substantially continuous process. The acid extraction of Step 3 can be carried out at room temperature but it is preferably performed at between about 30–60° C. The application of heat contributes to the efficiency of the filtering step and higher yields of bacitracin are obtained than when the extraction is carried out at room temperature.

The aforementioned aqueous acid solution of bacitracin extracted from the bacitracin-methylene disalicylic acid in Step 3 can be worked up in various ways to recover therefrom the final product, purified bacitracin of high physiological activity. For example, the extract can be neutralized with alkali, extracted with an alcohol such as n-butanol, squeezed with a liquid hydrocarbon such as pentane, purified as by treatment with ethanol and if necessary with activated charcoal, concentrated to a small volume, and the concentrate freeze-dried or poured into ice-cold acetone whereby bacitracin is precipitated from the concentrate. I have thus obtained white powders of bacitracin which are easily and completely soluble in water and have an activity of up to 65 units per milligram and a low acute toxicity of $LD_{50}$ greater than 500 units per 20 gram mouse.

In accordance with Step 4 of my processes, bacitracin can also be liberated from the bacitracin methylene disalicylic acid by dissolving the latter in an alcohol such as ethanol, clarifying the solution and mixing it with a ketone such as acetone whereby bacitracin is precipitated. In that manner, bacitracin is liberated in substantially quantitative yields and at a high level of purity. The alcohol extraction method permits processing in solution even at high concentrations without difficulty. The solutions may have concentrations of about 5000 bacitracin units per milliliter, which corresponds to a volume which is only about one percent of that of the original beer.

If it is desirable to prepare a water-soluble metal salt from the water-insoluble bacitracin methylene disalicylic acid, the latter can be solubilized by mixing it with an aqueous alkaline solution of any of the metal bases hereinbefore set forth, as illustrated by Step 5 of the flow sheet. The range of pH of the aqueous solution wherein solubilization will occur is between about 7.0 to 9.5. The solution of a water-soluble salt obtained by this procedure can be concentrated or evaporated to dryness in the manner hereinbefore described in Step 1a whereby a purified, powdery, water-soluble metal salt, for example the sodium salt, of bacitracin methylene disalicylic acid is obtained. Or the solution can be acidified, as shown in Step 6a, to reprecipitate the water-insoluble bacitracin methylene disalicylic acid.

In the following examples, bacitracin was assayed by the Federal Food and Drug Administration method of assay published in "Compilation of Regulations for Tests and Methods of Assay and Certification of Antibiotic Drugs." The methylene disalicylic acid was assayed from a solution by measuring the absorption of the solution at 310 mmu on a Beckman U. V. spectrophotometer (Model U) against a standard curve prepared from a stock solution of 0.1 mg. methylene disalicylic acid per ml. in acetate buffer.

The examples are given to illustrate the best mode of carrying out the process of my invention, but they are not to be construed as limiting my invention thereto.

*Example 1.—Recovery of bacitracin from fermentation liquor*

Twelve liters of crude fermentation liquor assaying at 40 units per milliliter were filtered and the filtrate mixed with an 0.1 percent aqueous alkaline solution of methylene disalicylic acid containing sodium hydroxide. This solution was acidified to pH 3.8 with hydrochloric acid. The resulting precipitate was filtered off, leaving a filtrate assaying at 3.7 units per milliliter. The wet filter cake was washed with water and thoroughly extracted with dilute aqueous hydrochloric acid at pH 1.5–2.0. The acid extract amounting to 600 milliliters or 5 percent of the volume of the original culture liquor was neutralized with sodium hydroxide, extracted with 300 milliliters n-butanol, and an equal volume of pentane was added to the extract and the remaining aqueous phase removed. The aqueous phase was diluted with one-half its volume of 95 percent ethanol and treated with 4 grams of "Darco–G–60" active charcoal. The filtrate from the charcoal treatment was concentrated in vacuo to a small volume and added to ice cold acetone, thereby precipitating the purified bacitracin. The precipitate was removed by filtration, dried in vacuo, weighed, and tested for potency and toxicity. The final yield was 4.07 grams of a pure white powder assaying at 62 units per milligram having a toxicity represented by $LD_{50}$ for mice of over 500 units and containing 52 percent of the bacitracin present in the original culture liquor.

*Example 2.—Extraction of bacitracin methylene disalicylic acid*

Ten grams of bacitracin methylene disalicylic acid were suspended in 50 milliliters of 80 percent ethanol. The suspension was brought to pH 8.4 by the addition of aqueous 30 percent sodium hydroxide and stirred thoroughly. This treatment left a considerable amount of brown gummy material undissolved which proved to be free of bacitracin activity. The brown sediment was removed by filtration.

The filtrate which had a total bacitracin activity of 255,000 units was mixed with 5 grams of charcoal, "Darco–G–60," and filtered. It was then brought to pH 0.6 to 1.0 by the addition of concentrated HCl and added slowly with stirring to 500 milliliters of cold acetone. A precipitate was formed which was removed by centrifuging and dissolved in 50 milliliters of water to yield a clear solution at pH 2.1.

The solution was brought to pH 6.5 by the addition of 30 percent aqueous sodium hydroxide, saturated with n-butanol and extracted with an equal volume of pentane, the resulting aqueous phase removed and the butanol-pentane mixture washed with 20 milliliters of distilled water. The combined aqueous extracts and washes (40 milliliters) were mixed with 20 milliliters of ethanol and 2 grams "Darco–G–60," stirred and filtered. The filtrate was evaporated in vacuo to 20 milliliters and added, with stirring, to 200 milliliters of cold acetone. The resulting bacitracin was removed by centrifuging and dried in vacuo. It assayed at 64.5 units per milligram. The yield was 3.5 grams of bacitracin having an activity of 226,750 units amounting to about 90 percent of the activity of the starting material.

*Example 3.—Water-soluble sodium salt of bacitracin methylene disalicylic acid*

Twenty-five pounds of sodium carbonate were dissolved in about 23 gallons of water. The solution had a pH of about 8.3. To this solution were added 55 pounds of the water-insoluble bacitracin methylene disalicylic acid. The suspension was agitated until the compound was completely dissolved. A small amount of anti-foam agent such as a low viscosity (100 centistokes) polymethylsiloxane, was added during this procedure to control foaming. When the material is completely dissolved, the pH of the solution should not be below 7.5 and, if necessary, it is adjusted to that level by the addition of sodium hydroxide. Water was then added to dilute to a 25–30 percent solution of the bacitracin compound. This solution was filtered, after addition of a filter aid such as "Celite," and the filtrate was then spray-dried at an input temperature of about 300° F. The resulting powder was dried in vacuo to a moisture content of less than 5 percent. Upon dissolution in water it gave a clear solution, depending upon the degree of purity of the bacitracin methylene disalicylic acid used as initial material. By this method, a product which had a potency of about 14 units of bacitracin per milligram, gave a water-soluble powder of the sodium salt having a potency of 10.8 units per milligram. Two grams of the salt dissolved in 100 milliliters of water gave a solution having a pH of 9.5. The moisture content of the powder was 4.1 percent and its ash content was 23 percent.

This sodium salt of bacitracin methylene disalicylic acid, in dilute alkaline solution, retains at least 90 percent of its original potency for 2–3 weeks when kept at 25° C., whereas free bacitracin retained 90 percent of its original potency for not more than 2 days.

In like manner, the potassium salt can be prepared starting with potassium carbonate instead of potassium carbonate.

The water-insoluble bacitracin methylene disalicylic acid, when purified to constant bacitracin potency by repeated dissolution in alkaline and reprecipitation with acid, analyzed as follows:

| | Sample I | Sample II |
|---|---|---|
| Bacitracin potency units per milliliter | 42.8 | 40.7 |
| Percent: | | |
| Methylene disalicylic acid | 27.5 | 28.6 |
| Ash | 0 | 0 |
| C | 54.40 | 54.99 |
| H | 6.74 | 6.83 |
| N | 10.90 | 10.11 |
| O | 26.16 | 26.35 |
| S | 1.80 | 1.72 |

The average analytical value of 28 percent methylene disalicylic acid in this substantially homogeneous bacitracin methylene disalicylic acid is in excellent agreement with the value for methylene disalicylic acid present in a bacitracin methylene disalicylic acid obtained by the reaction between two moles of methylene disalicylic acid and one mole of a bacitracin having a molecular weight in the range of between about 1460 to 1480; the latter has a molecular weight of 2036 to 2056 and its content of methylene disalicylic acid is 28 percent. Bacitracin having a molecular weight of about 1460 to 1480 was obtained as major fraction when a crude bacitracin was purified by counter-current distribution as described by Lyman C. Craig et al. (J. Biol. Chem. 200:765–773, 1953) and independently by Jerker Porath (Acta chemica Scandinavica 6:1237–1248, 1952). When assayed by the counter-current distribution method of Craig et al., the bacitracin employed in the above described analyses contained about 70 percent of this pure bacitracin fraction.

The above analyzed bacitracin methylene disalicylic acid was found to be soluble in pyridine, ethylalcohol, and less to insoluble in acetone, ethylether, chloroform, pentane, benzene. It is soluble in dilute aqueous alkali at pH 6 and higher and increasingly insoluble at pH 6 to 3.

The water-soluble metal salts, for example the sodium salt, of bacitracin methylene disalicylic acid of the present invention have utility for growth promotion in young farm animals, in the treatment of infections in animals including the treatment of blue comb, in fowl, respiratory disease, diarrhea, and the like, in which they are at least as effective as bacitracin itself. The salts may be administered orally, in the usual feed compositions or in drinking water. They have a low oral toxicity and a slow intestinal tract absorption rate which is essential in treating intestinal diseases in animals.

The water-insoluble bacitracin methylene disalicylic acid has utility as an intermediate in the recovery of free bacitracin from fermentation liquors in high yields and purity, as shown above, and it may also be used in veterinary application, as above described.

It now becomes apparent from the foregoing description that substantial technical and economic advantages result from my invention, for example, Anker et al., above referred to, remove bacitracin from the crude culture liquor by extraction with butanol which requires the use of large amounts of the solvent in about 50 percent by volume of the beer and is inconvenient and expensive. Only inconsequential quantities of n-butanol are needed for the extraction of bacitracin from the aqueous acid extract of the water-insoluble bacitracin methylene disalicylic acid precipitated from the crude liquor in accordance with my above Example 1, since the aqueous acid extract of bacitracin has a volume which is only 5 percent or less of that of the original liquor. My processes yield bacitracin in substantially quantitative yields and high purity and potency of up to 60 units per milligram, as described above.

This application is a continuation-in-part of my application Serial No. 348,583 filed April 3, 1953, which is a continuation-in-part of my applications Serial No. 154,189 and 154,190 filed April 5, 1950, now abandoned.

Various modifications may be made in the method of the present invention without departing from the spirit or scope thereof and it is to be understood that I limit myself only as defined in the appended claims.

I claim:

1. In a process for the preparation of an alkali metal salt of bacitracin methylene disalicylic acid from a crude bacitracin-containing fermentation liquor which has been clarified to remove solid fermentation residues, the step which comprises: mixing methylene disalicylic acid with said clarified crude fermentation liquor under alkaline conditions.

2. The process of claim 1 wherein the said fermentation liquor is made alkaline to a pH of between about pH 7.0 and about pH 9.5 by the addition of an alkali metal base before mixing therewith the methylene disalicylic acid.

3. The process of claim 1 wherein said methylene disalicylic acid is added to the clarified fermentation liquor as an alkaline solution of the methylene disalicylic acid.

4. The process of claim 1 wherein said methylene disalicylic acid is solubilized in an aqueous alkali at a pH between about 7.0 and about 9.5 before addition to said clarified fermentation liquor.

5. The process of claim 1 wherein said fermentation liquor is made alkaline to a pH of between about pH 7.0 and about pH 9.5 by the addition of an alkali metal base and wherein said methylene disalicylic acid is added in an amount between about 1.0 and about 2.0 parts by weight of bacitracin in said crude clarified fermentation liquor.

6. In a process for the preparation of a water-insoluble bacitracin methylene disalicylic acid from a crude, bacitracin-containing fermentation liquor clarified to remove the solid fermentation residue, the steps which comprise: mixing methylene disalicylic acid with said crude clarified liquor under alkaline conditions; acidifying said resulting admixture to precipitate bacitracin methylene disalicylic acid; and, recovering the bacitracin methylene disalicylic acid precipitate.

7. The process set forth in claim 6 wherein said clarified fermentation liquor is made alkaline to a pH of between about pH 7.5 and about pH 9.5 by the addition of an alkali metal base and wherein said methylene disalicylic acid is added in an amount between about 1.0 and about 2.0 parts per part by weight of bacitracin in said fermentation liquor and wherein said resulting admixture is acidified to a pH of between about pH 6.0 and about pH 2.5.

8. In a process for the recovery of free bacitracin from a crude bacitracin-containing fermentation liquor clarified to remove solid fermentation residues, the steps comprising: mixing methylene disalicylic acid with said crude clarified liquor under alkaline conditions; acidifying the resulting admixture; separating from said admixture bacitracin methylene disalicylic acid as a water-insoluble precipitate; treating said precipitate with aqueous acid having a pH of between about pH 1.0 and about pH 2.5 to liberate free bacitracin; filtering the resulting solution to remove methylene disalicylic acid therefrom; and, recovering free bacitracin from the filtrate.

9. The process of isolating bacitracin from a crude filtered fermentation liquor containing it which comprises: mixing the liquor with an 0.1 percent aqueous alkaline solution of methylene disalicylic acid at pH 3.8; filtering off the resulting precipitate; washing the wet filter cake with water; extracting the washed cake with water at pH 1.5 to pH 2.0; neutralizing the extract; extracting the neutralized liquid with n-butanol; adding pentane to the extract; removing the resulting aqueous phase; diluting said phase with 95 percent alcohol and treating it with charcoal and filtering it; concentrating the filtrate in vacuo; adding ice-cold acetone to the concentrate; and, filtering off the resulting precipitate and drying it in vacuo.

10. The reaction product of bacitracin and methylene disalicylic acid.

11. An alkali-metal salt of the reaction product of bacitracin and methylene disalicylic acid.

12. The sodium salt of the reaction product of bacitracin and methylene disalicylic acid.

13. Bacitracin-containing compounds selected from the group consisting of the reaction product of bacitracin and methylene disalicylic acid and the alkali metal salts of said reaction product.

No references cited.